United States Patent [19]
Dzierzbicki

[11] Patent Number: 6,138,368
[45] Date of Patent: Oct. 31, 2000

[54] SPRINKLER HEAD LEVELER

[76] Inventor: Mark L. Dzierzbicki, 413 Cambridge Way, Bolingbrook, Ill. 60440

[21] Appl. No.: 09/010,017

[22] Filed: Jan. 21, 1998

[51] Int. Cl.[7] .............................. G01C 9/00; G01C 9/36
[52] U.S. Cl. .............................. 33/371; 33/390; 33/340
[58] Field of Search .............................. 33/371, 372, 373, 33/333, 334, 340, 354, 370, 376, 390

[56] References Cited

U.S. PATENT DOCUMENTS

| | | | |
|---|---|---|---|
| 2,206,003 | 6/1940 | Donnell | 33/390 |
| 2,240,337 | 4/1941 | Lannen | 33/390 |
| 4,092,882 | 6/1978 | Whitmore | 33/371 |
| 5,421,094 | 6/1995 | McCord et al. | 33/373 |
| 5,444,918 | 8/1995 | Leisinger | 33/384 |
| 5,456,014 | 10/1995 | Wilson | 33/390 |
| 5,459,934 | 10/1995 | Heroux | 33/373 |
| 5,509,210 | 4/1996 | Murphy | 33/382 |
| 5,625,955 | 5/1997 | Han | 33/366 |
| 5,632,484 | 5/1997 | Lambert . | |
| 5,655,309 | 8/1997 | Hadrami | 33/390 |
| 5,685,083 | 11/1997 | Decesare | 33/390 |

*Primary Examiner*—Christopher W. Fulton
*Attorney, Agent, or Firm*—Marshall, O'Toole, Gerstein, Murray & Borun

[57] ABSTRACT

The present invention is directed to a sprinkler head leveling for ensuring that the longitudinal axis of a sprinkler head assembly is substantially vertically aligned. The sprinkler head leveler uses a hollow cylindrical base which slides over the sprinkler head bonnet and external casing after the sprinkler head is inserted in the ground. A bull's-eye level is mounted to the base and disposed above a top surface of the base to provide clearance from the attachment hardware and embossments on the top of the sprinkler head assembly. In this way, the leveling device can be used to vertically align the sprinkler head assembly without interference from the surface of the bonnet and the surrounding ground.

14 Claims, 2 Drawing Sheets

SPRINKLER HEAD LEVELER

FIELD OF THE INVENTION

The present invention relates generally to leveling devices and, more specifically, to a sprinkler head leveler for use during installation and maintenance of in-ground sprinkler systems.

DESCRIPTION OF THE RELATED ART

In in-ground sprinkler systems, a sprinkler head assembly consists of a sprinkler head, a tubular casing enclosing the sprinkler head, and a cover, which is commonly referred to as a bonnet, mounted to the sprinkler head and designed to cover the end of the casing. When the sprinkler system is installed, the sprinkler head assembly is buried in the earth with the bonnet at or slightly below ground level. When the sprinkler system is operating, water pressure lifts the nozzle stem of the sprinkler head through a hole in the center of the bonnet above ground level, thereby enabling the sprinkler head to spray water on the surrounding area. When the sprinkler system is not in operation, the nozzle stem resides within the bonnet and the casing so that the exposed portions of the sprinkler system are visually unobtrusive and do not present a safety hazard.

To ensure that the sprinkler head will spray a substantially circular surface area, the sprinkler head assembly must be installed with the longitudinal axes of the casing and sprinkler head substantially vertical. Due to the configuration of the casing and the bonnet of the sprinkler head assembly, it is difficult to ensure that the sprinkler head is plumb using leveling devices that are currently available. In many of the sprinkler systems currently on the market, the bonnet for the sprinkler head does not provide a planar surface on which to set a leveler. In some systems, such as systems employing impact heads and pop-up mist heads, the hardware used to attach the bonnet to the sprinkler head sticks up beyond the top surface of the bonnet. In other systems, the sprinkler head covers are embossed with raised lettering, arrows and other designs that make the top surface of the bonnet too uneven for placement thereon of previous levelers.

Even in systems with sprinkler head bonnets having a planar surface on which to place a leveler, the leveler is likely to fall off the bonnet during installation as dirt is packed around the casing. Moreover, because the casing and sprinkler head are buried at or below ground level, the ground and the grass near the sprinkler head can interfere with the use of a vile liquid bubble level. Therefore, there is a need for an improved leveling device for ensuring that sprinkler heads are plumb during the installation of and maintenance on an in-ground sprinkler system.

SUMMARY OF THE INVENTION

The present invention is directed to a sprinkler head leveler for ensuring that the longitudinal axis of a sprinkler head assembly is substantially vertical. The sprinkler head leveler includes a hollow cylindrical base which slides over the sprinkler head bonnet and external casing after the sprinkler head is inserted in the ground. A bull's-eye level is mounted to the base above a top surface of the base thereby disposing the level above the bonnet so that the top surface of the base and the bottom of the level are separated by a distance when the base is placed on the casing and the bonnet. In this way, the leveling device can be used to plumb the sprinkler head without interference from attachment hardware and embossments on the surface of the bonnet and from the surrounding ground.

According to one aspect of the present invention, a sprinkler head leveler includes a hollow cylindrical base having a top surface and a bottom opening, a plurality of risers spaced about and connected to the top surface of the base and extending upwardly from the top surface of the base, a hollow cylindrical ring connected to each of the risers at an end opposite the base, wherein the ring is coaxial with the base, and a circular fluid level having a circle disposed on its exterior. The level is connected to the ring so that the level is disposed above the top surface of the base. The circle is coaxial with the level and a vertical axis of the level is parallel with a longitudinal axis of the base of the leveler such that the bubble is encompassed by the circle when the longitudinal axis of the base is substantially vertical.

The base of the leveler may include an inwardly extending flange that defines an engagement surface and has an inner diameter smaller than the outer diameter of the bonnet. When the leveler slides onto a bonnet, the engagement surface engages a top surface of the bonnet such that the vertical axis of the level is approximately parallel to the longitudinal axis of the sprinkler head assembly. Alternatively, the leveler may further include a plurality of support members extending downwardly from either the ring or the risers. The support members are disposed within the base and below the top surface of the base. The legs are dimensioned so that the vertical axis of the level is approximately perpendicular to a surface when all of the support members engage the surface.

According to another aspect of the present invention, a leveler for a cylindrical object having a longitudinal axis and a non-planar end surface is adapted to indicate when the longitudinal axis is substantially vertically aligned includes a hollow cylindrical base having a top surface and a bottom opening, a riser connected to the top surface of the base and extending upwardly from the top surface of the base, and a circular fluid level having an air bubble in the interior and a circle disposed on the exterior thereof and coupled to the riser whereby the level is disposed above the top surface of the base. The leveler further includes an engagement surface defined by one of the base and the riser. The bottom opening of the base slides down over the non-planar end surface of the cylindrical object, and the engagement surface engages the end surface and the casing such that the vertical axis of the level is approximately parallel to the longitudinal axis of the cylindrical object. When the leveler is mounted on the object, the bubble in the level is encompassed by the circle when the longitudinal axis of the cylindrical object is substantially vertical.

The base of the leveler may include an inwardly extending flange that defines the engagement surface and having an inner diameter smaller than the outer diameter of the cylindrical object. When the leveler slides onto the object, the engagement surface engages the end surface of the object such that the vertical axis of the level is approximately parallel to the longitudinal axis of the object. Alternatively, the leveler may further include a plurality of support members extending downwardly from either the level or the riser. The support members are disposed within the base and below the top surface of the base. The legs are dimensioned so that the vertical axis of the level is approximately parallel to the longitudinal axis of the cylindrical object when all of the support members engage the end surface.

The features and advantages of the invention will be apparent to those of ordinary skill in the art in view of the detailed description of the preferred embodiment, which is made with reference to the drawings, a brief description of which is provided below.

DETAILED DESCRIPTION OF THE PREFERRED EMBODIMENTS

Figure 1:
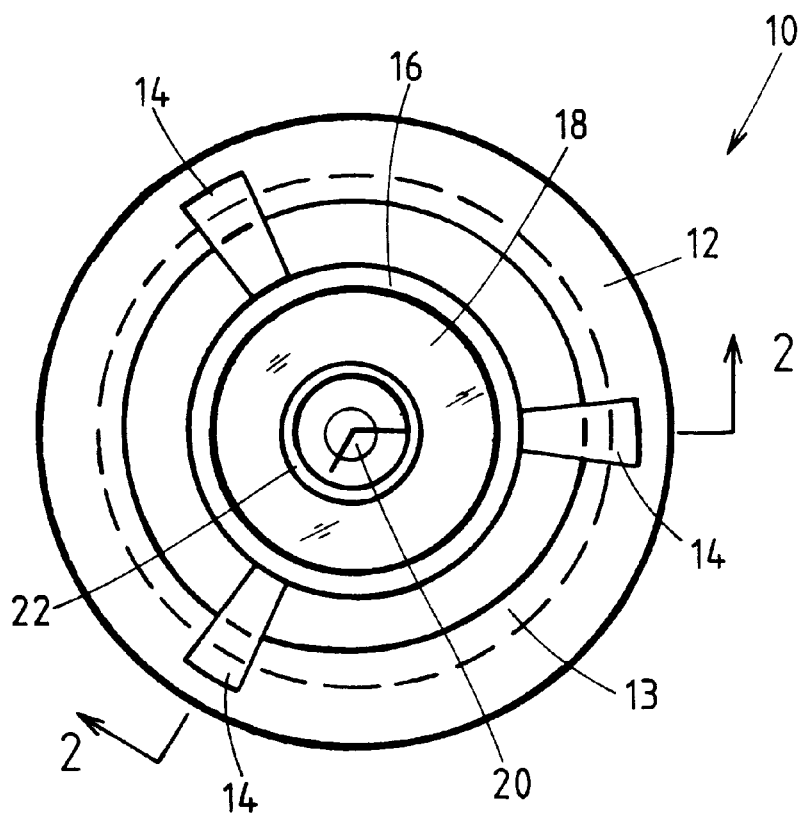
FIG. 1 is a top view of a sprinkler head leveler according to the present invention.

FIG. 1 illustrates a sprinkler head leveler 10 according to the present invention. The sprinkler head leveler 10 includes a hollow cylindrical base 12 having an inner diameter and an inwardly extending flange 13 proximate the top of the base having an inner diameter that is smaller than the inner diameter of the base 12. The leveler 10 further includes three risers 14 mounted on the base 12 proximate the flange 13 and evenly spaced around the base 12. The risers 14 extend upwardly from the base 12 and inwardly in the direction of the longitudinal axis of the base 12. A circular support ring 16 is mounted on the ends of the risers 14 opposite the base 12. The circular support ring 16 end circles and retains a circular bubble level 18 having an internal bubble 20 and a target circle 22 on the exterior thereof. The target circle 22 is coaxial with the vertical axis of level 18 such that the bubble 20 is encompassed by the target circle 22 when the vertical axis of the level 18 is substantially vertical. In a preferred embodiment, the base 12, support ring 16, level 18, and the target circle 22 are coaxially aligned.

Figure 2:
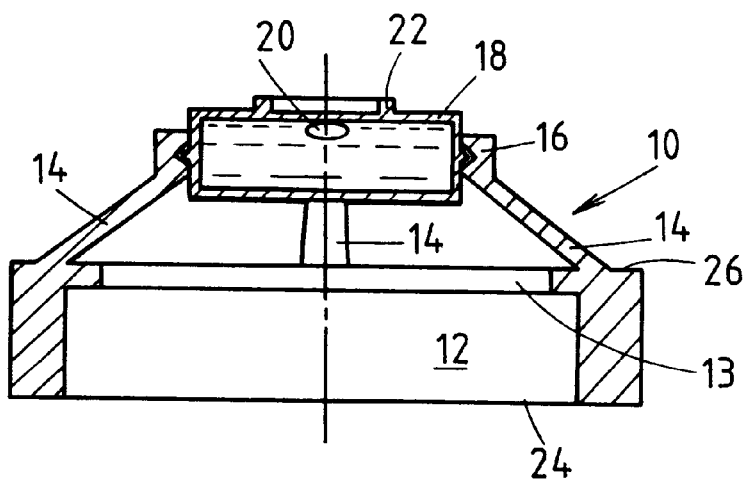
FIG. 2 is an aligned side sectional view of the sprinkler head leveler of FIG. 1 taken along line 2—2.

Referring to FIG. 2, which is an aligned side sectional view, the vertical relationship of the elements of the sprinkler head leveler 10 is more clearly illustrated. The base 12 of the sprinkler head leveler 10 has a bottom opening 24 through which a sprinkler head assembly (not shown) passes when the leveler 10 is placed onto the sprinkler head assembly, and top surface 26 on which the risers 14 are mounted. The risers 14 extend upwardly and inwardly from the top surface 26 and converge on the support ring 16. The level 18 encircled by the ring 16 is disposed above the top surface 26 of the base 12 to provide clearance for attachment hardware and embossments on the top of the sprinkler head assembly. The base 12, flange 13, support ring 16, level 18, and target circle 22 are illustrated as being coaxially aligned in FIG. 2. However, other non-coaxial configurations in which the vertical axis of the level 18 is approximately parallel to the longitudinal axis of the base 12 will be apparent to those of ordinary skill in the art and are contemplated by the inventor as having use with the present invention.

Figure 3:
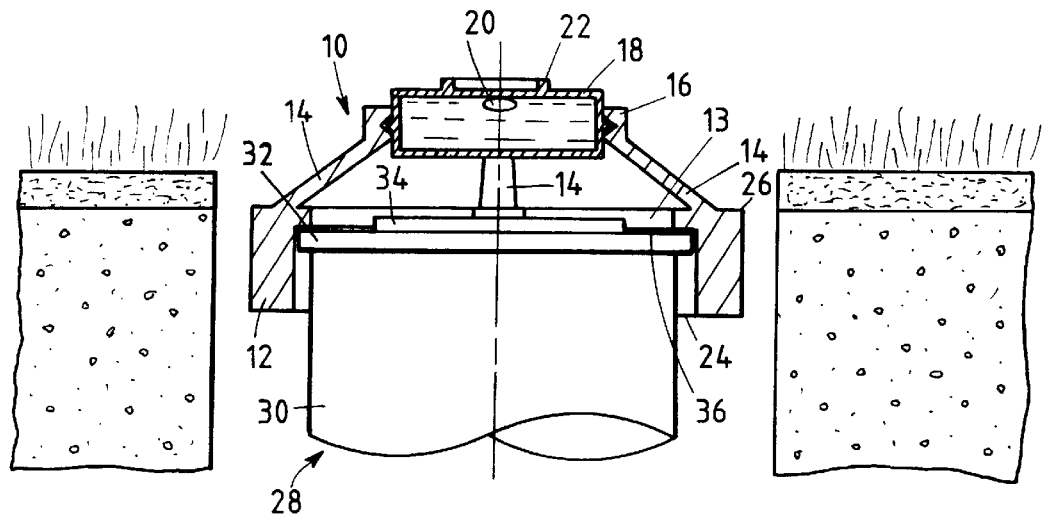
FIG. 3 is an aligned side sectional view of the sprinkler head leveler of FIG. 1 taken along line 2—2 and mounted on an in-ground sprinkler head assembly.

FIG. 3 illustrates the sprinkler head leveler 10 disposed on a sprinkler head assembly 28 during installation. The sprinkler head assembly 28 includes a tubular outer casing 30, a sprinkler head bonnet 32, and a sprinkler head (not shown) disposed therein. Embossing or attachment hardware 34 rising above the top surface 36 of the sprinkler head bonnet 32 prevent the level 18 from being set directly on the bonnet 32 in such a way that the level 18 can accurately determine when the assembly 28 is substantially vertically aligned.

The base 12 is dimensioned so that the inner diameter of the bottom opening 24 is slightly larger than the outer diameter of the bonnet 32, thereby allowing the leveler 10 to be slipped on to the sprinkler head assembly 28. Conversely, the inner diameter of the flange 13 is slightly smaller than the outer diameter of the bonnet 32. The base 12 slides down on to the sprinkler head assembly 28 until the bonnet 32 is engaged by a bottom surface of the flange 13. At this point, the longitudinal axis of the sprinkler head assembly 28 is aligned substantially parallel to, if not coincident with, the vertical axis of the level 18. In an alternative embodiment, the base 12 is provided without the flange 13 and the bonnet 32 is engaged by the risers 14 proximate the point of intersection of the risers 14 and the top surface 26 to align the vertical axis of the level 18 approximately parallel to the longitudinal axis of the sprinkler head assembly 28.

With the leveler 10 thus mounted on the sprinkler head assembly 28, the sprinkler head assembly 28 is adjusted until the bubble 20 of the level 18 is encompassed by the target circle 22. At this point, the longitudinal axis of the sprinkler head assembly 28 is substantially vertical and the installer can pack dirt around the outer casing 30 to stabilize the sprinkler head assembly 28 in this position. Because the base 12 encircles the sprinkler head bonnet 32 and a portion of the outer casing 30, the sprinkler head leveler 10 is held secure on the sprinkler head assembly 28 as the assembly 28 is jostled during the installation. Once the outer casing 30 is stabilized, the sprinkler head leveler 10 is removed from the sprinkler head assembly 28 so that installation of the sprinkler head assembly 28 may be completed.

Figure 4:
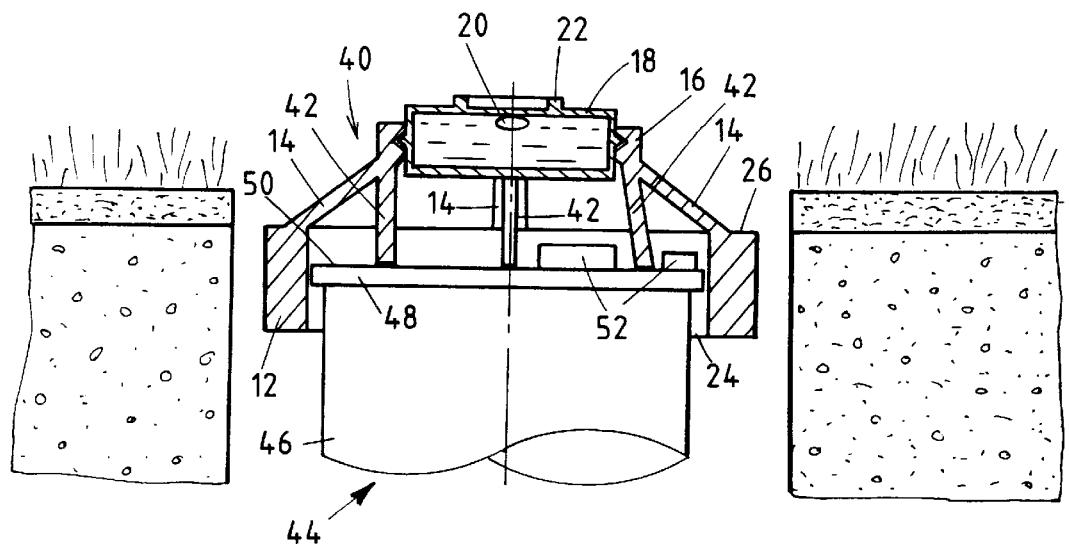
FIG. 4 is an aligned side sectional view of the sprinkler head leveler of FIG. 1 taken along line 2—2 and mounted on an in-ground sprinkler head assembly and including support legs according to the present invention.

In some sprinkler systems, the embossing and/or attachment hardware are located proximate the outer edges of the sprinkler head bonnet such that the flange 13 cannot engage the sprinkler head bonnet in such a way that the longitudinal axis of the assembly and the vertical axis of the level are parallel. An alternative embodiment of a sprinkler head leveler 40 adapted for use with a sprinkler head assembly with an uneven top surface is illustrated in FIG. 4 wherein elements similar to the elements of the leveler 10 are identified with the same reference numerals. The leveler 40 includes a plurality of support legs 42 spaced about and extending downwardly from the ring 16. The legs 42 are disposed within the base 12 and extend below the top surface 26 of the base 12. The legs 42 are dimensioned such that the vertical axis of the level 18 is approximately perpendicular to a surface when the legs 42 are touching the surface.

The leveler 40 is shown in FIG. 4 disposed on a sprinkler head assembly 44 during installation. The assembly 44 includes a tubular casing 46 enclosing a sprinkler head (not shown), and a bonnet 48 attached to the sprinkler head and covering the top opening of the casing 46. A top surface 50 of the bonnet 48 includes embossments 52 located proximate the outer edge of the bonnet 48 that prevent the risers 14 from simultaneously engage the bonnet 48 such that the vertical axis of the level 18 is approximately parallel to the longitudinal axis of the sprinkler head assembly 44. Therefore, the support legs 42 are required to properly align the level 18 with the assembly 44.

In a similar manner as described above, the base 12 is dimensioned so that the bottom opening 24 has an inner diameter slightly larger than the outer diameter of the bonnet 48. The base 12 slides down on to the sprinkler head assembly 44 until the support legs 42 engage the top surface 50 of the bonnet 48. If necessary, the leveler 40 is rotated until each of the support legs 42 avoids the embossments 52 and engages the top surface 50 of the bonnet 48 directly. At this point, the longitudinal axis of the assembly 44 is aligned substantially parallel to, if not coincident with, the vertical axis of the level 18.

With the leveler 40 thus mounted on the sprinkler head assembly 44, the sprinkler head assembly 44 is adjusted until the bubble 20 of the level 18 is encompassed by the target circle 22. At this point, the longitudinal axis of the sprinkler head assembly 44 is substantially vertical and the installer can pack dirt around the outer casing 46 to stabilize the sprinkler head assembly 44 in this position. Because the base 12 encircles the sprinkler head bonnet 48 and a portion of the outer casing 46, the sprinkler head leveler 40 is held secure on the sprinkler head assembly 44 as the assembly 44 is jostled during the installation. Once the outer casing 46 is stabilized, the sprinkler head leveler 40 is removed from the sprinkler head assembly 44 so that installation of the sprinkler head assembly 44 may be completed.

While the present invention has been described with reference to the specific examples, which are intended to be illustrative only and not to be limiting of the invention, it will be apparent to those of ordinary skill in the art that changes, additions, and/or deletion may be made to the disclosed embodiment without departing from the spirit and scope of the invention.

What is claimed is:

1. A sprinkler head leveler for a sprinkler head having a head top surface, comprising:
    a hollow cylindrical base having a base top surface, a top opening, a bottom opening, a base circumference and a base longitudinal axis;
    a plurality of risers spaced about and connected to the base top surface and extending upwardly from the top surface of the base; and
    a circular fluid level having an air bubble on the interior, a circle disposed on the exterior thereof, and a level vertical axis, the level connected to the plurality of risers whereby the level is disposed above the base top surface and the level vertical axis is approximately parallel to the base longitudinal axis and disposed within the base circumference;
    wherein the hollow cylindrical base slidably engages the sprinkler head such that at least a portion of the head top surface is disposed within the top opening; and
    wherein the circle is coaxial with the level such that the bubble is encompassed by the circle when the level vertical axis and the base longitudinal axis are substantially vertical.

2. A sprinkler head leveler according to claim 1, wherein the level vertical axis and the base longitudinal axis are coincident.

3. A sprinkler head leveler according to claim 1, further comprising a hollow cylindrical ring connected to each of the risers at an end opposite the base and to the level, thereby connecting the level to the risers.

4. A sprinkler head leveler according to claim 3, wherein the ring has a ring vertical axis coincident with the level vertical axis and the base longitudinal axis.

5. A sprinkler head leveler according to claim 3, wherein the ring has an outer diameter smaller than an outer diameter of the base and wherein the risers extend upwardly and inwardly from the top surface of the base to the ring.

6. A sprinkler head leveler according to claim 3, further comprising a plurality of support members extending downwardly from one of the ring and each of the risers, each support member having a free end disposed within the base and disposed below the base top surface by an approximately equal vertical distance.

7. A sprinkler head leveler according to claim 1, wherein the base further comprises a flange extending inwardly from the top surface of the base and defining an engagement surface.

8. A sprinkler head leveler according to claim 1, further comprising at least three risers.

9. A leveler for a cylindrical object having an object longitudinal axis and a non-planar end surface, the leveler comprising:
    a hollow cylindrical base having a top surface and a bottom opening;
    a riser connected to the top surface of the base and extending upwardly from the top surface of the base; and
    a circular fluid level having an air bubble on the interior and a circle disposed on the exterior thereof coupled to the riser whereby the level is disposed above the top surface of the base;
    wherein one of the base and the riser defines an engagement surface and the bottom opening of the base slidably engages the non-planar end surface of the cylindrical object such that the engagement surface engages part of the non-planar end surface to permit vertical alignment of the longitudinal axis of the cylindrical object when the bubble is encompassed by the circle.

10. A leveler according to claim 9, further comprising a plurality of risers spaced about and connected to the top surface of the base and extending upwardly from the top surface of the base.

11. A leveler according to claim 9, wherein the base has a base longitudinal axis and the level has a level vertical axis approximately parallel to the base longitudinal axis.

12. A leveler according to claim 11, wherein the base longitudinal axis and the level vertical axis are approximately parallel.

13. A leveler according to claim 9, wherein the base further comprises a flange extending inwardly from the top surface of the base and defining the engagement surface.

14. A leveler according to claim 9, further comprising:
    a plurality of support members extending downwardly from one of the level and the riser, each support member having a free end disposed within the base and disposed below the top surface of the base; and
    a plurality of engagement surface each defined by the free end of one of the support members and engaging the non-planar surface of the cylindrical object such that the bubble is encompassed by the circle when the longitudinal axis of the cylindrical object is substantially vertical.

* * * * *